GYROMAGNETIC RESONANCE APPARATUS

Filed July 13, 1953 4 Sheets-Sheet 1

INVENTORS
MARVIN CHODOROW &
RUSSELL H. VARIAN
BY
Paul B. Hunter
ATTORNEY

INVENTORS
MARVIN CHODOROW &
RUSSELL H. VARIAN
BY Paul B. Hunter
ATTORNEY

INVENTORS
MARVIN CHODOROW &
RUSSELL H. VARIAN
BY
Paul B. Hunter
ATTORNEY

July 7, 1959 M. CHODOROW ET AL 2,894,209

GYROMAGNETIC RESONANCE APPARATUS

Filed July 13, 1953 4 Sheets-Sheet 4

INVENTORS
MARVIN CHODOROW &
RUSSELL H. VARIAN
BY Paul B. Hunter
ATTORNEY

United States Patent Office 2,894,209

Patented July 7, 1959

2,894,209

GYROMAGNETIC RESONANCE APPARATUS

Marvin Chodorow, Menlo Park, and Russell H. Varian, Cupertino, Calif., assignors to Varian Associates, San Carlos, Calif., a corporation of California

Application July 13, 1953, Serial No. 367,538

13 Claims. (Cl. 331—94)

This invention relates, generally, to gyromagnetic resonance apparatus and method and, more particularly, to the utilization of paramagnetic resonance to control the impedance characteristics of electrical apparatus useful, for example, in automatically stabilizing the frequency of an oscillator or in tuning an oscillator over wide frequency bands or for frequency modulating an oscillator.

One object of this invention is to provide novel paramagnetic resonance apparatus and method for varying the effective electrical length of a transmission line.

Another object of this invention is to provide novel paramagnetic resonance apparatus and method for varying the phase shift through a transmission line having fixed physical characteristics.

Another object of this invention is to provide new and novel method and means employing a paramagnetic resonance source for stabilizing a radio frequency source, such as, for example, a klystron or traveling wave tube oscillator.

Another object of this invention is to provide paramagnetic resonance means associated with the feedback circuit of an oscillator for rendering said oscillator highly selective and stabilized as to frequency.

Still another object of this invention is to provide new and novel paramagnetic method and means for automatically tuning a radio frequency source over a wide band of radio frequencies.

Another object of this invention is to provide a novel paramagnetic resonance method and means for frequency modulating an electron discharge device.

These and other objects and advantages will become more apparent after reading the following specification taken in connection with the drawings in which Fig. 1 discloses one embodiment of this invention wherein a wave guide contains a volume of paramagnetic matter located within the unidirectional magnetic field produced by a magnet adjacent the wave guide at the point where the matter is located;

Figures 1, 2, 3, 4, 5:
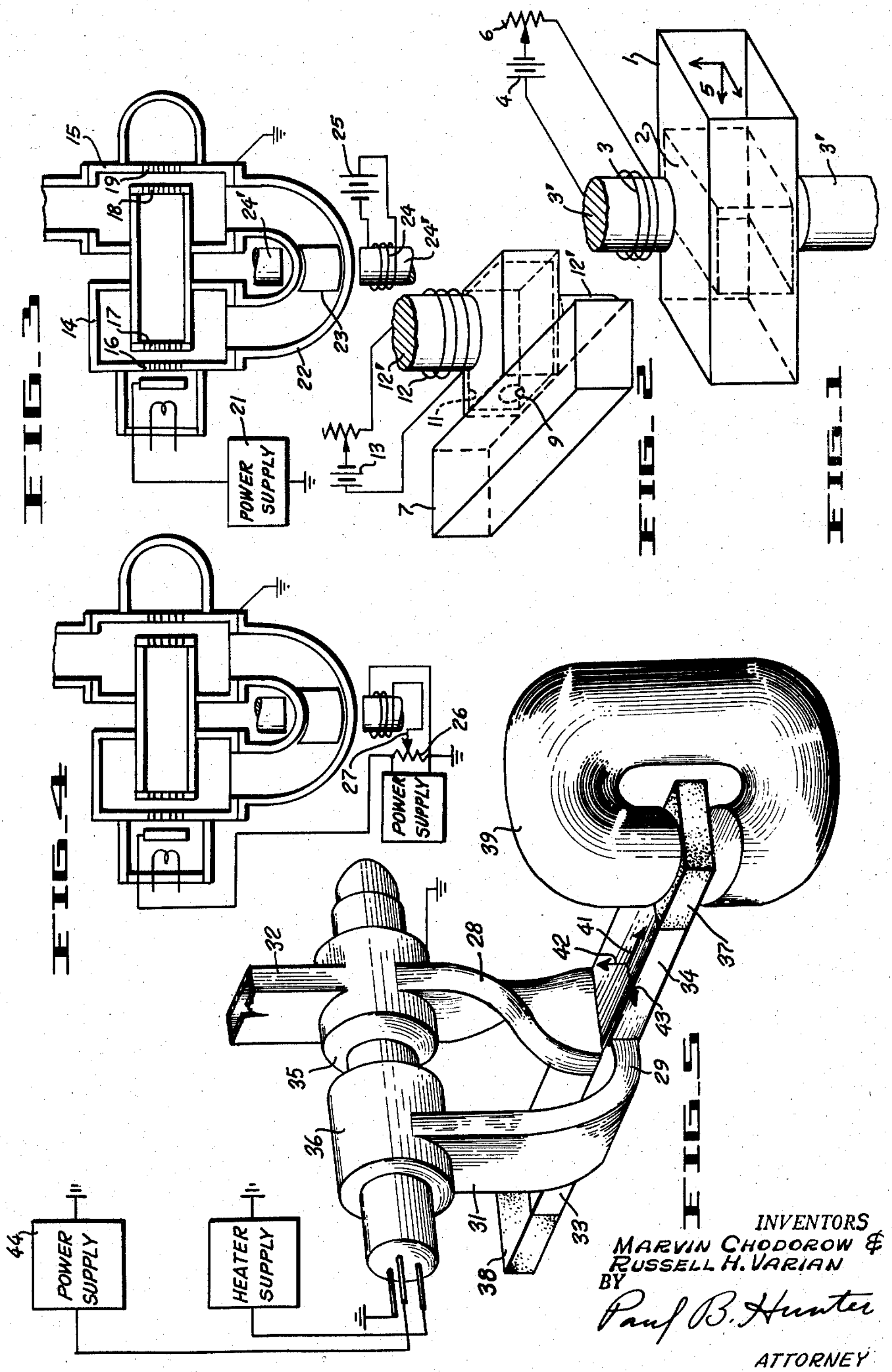
Fig. 2 shows another embodiment of this invention wherein a wave guide having a shunt arm extending from the side thereof contains a volume of paramagnetic matter located in the shunt arm and a magnet adjacent the shunt arm.
Fig. 3 shows another embodiment of this invention utilizing paramagnetic resonance to stabilize the frequency of a klystron oscillator.
Fig. 4 shows another embodiment of this invention which utilizes paramagnetic resonance to automatically stabilize the frequency of a klystron oscillator driven by an unstable power supply.
Fig. 5 shows another embodiment of this invention wherein a magic tee and an associated source of paramagnetic resonance is utilized to stabilize the frequency of a klystron oscillator.
Figures 6, 7:
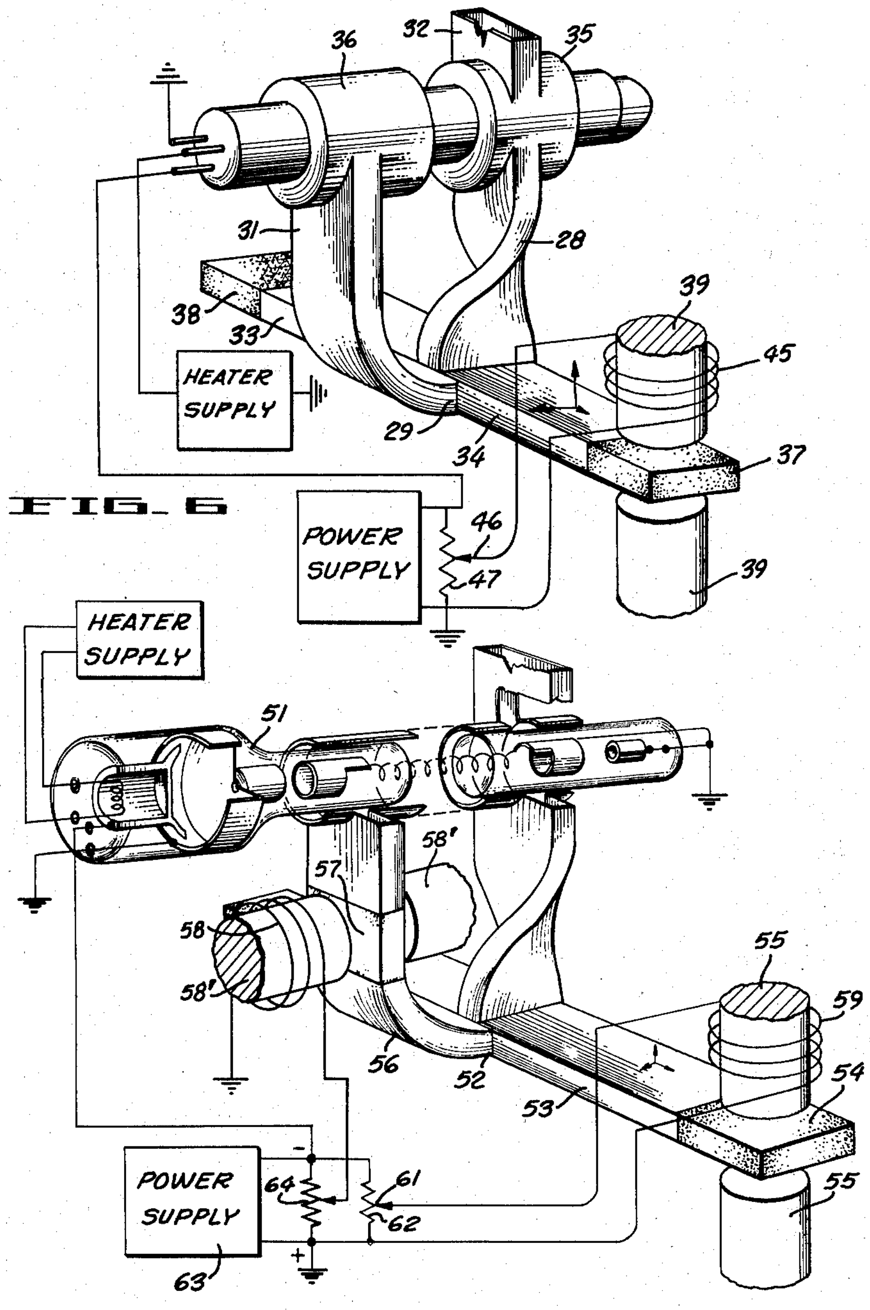
Figures 8, 9:
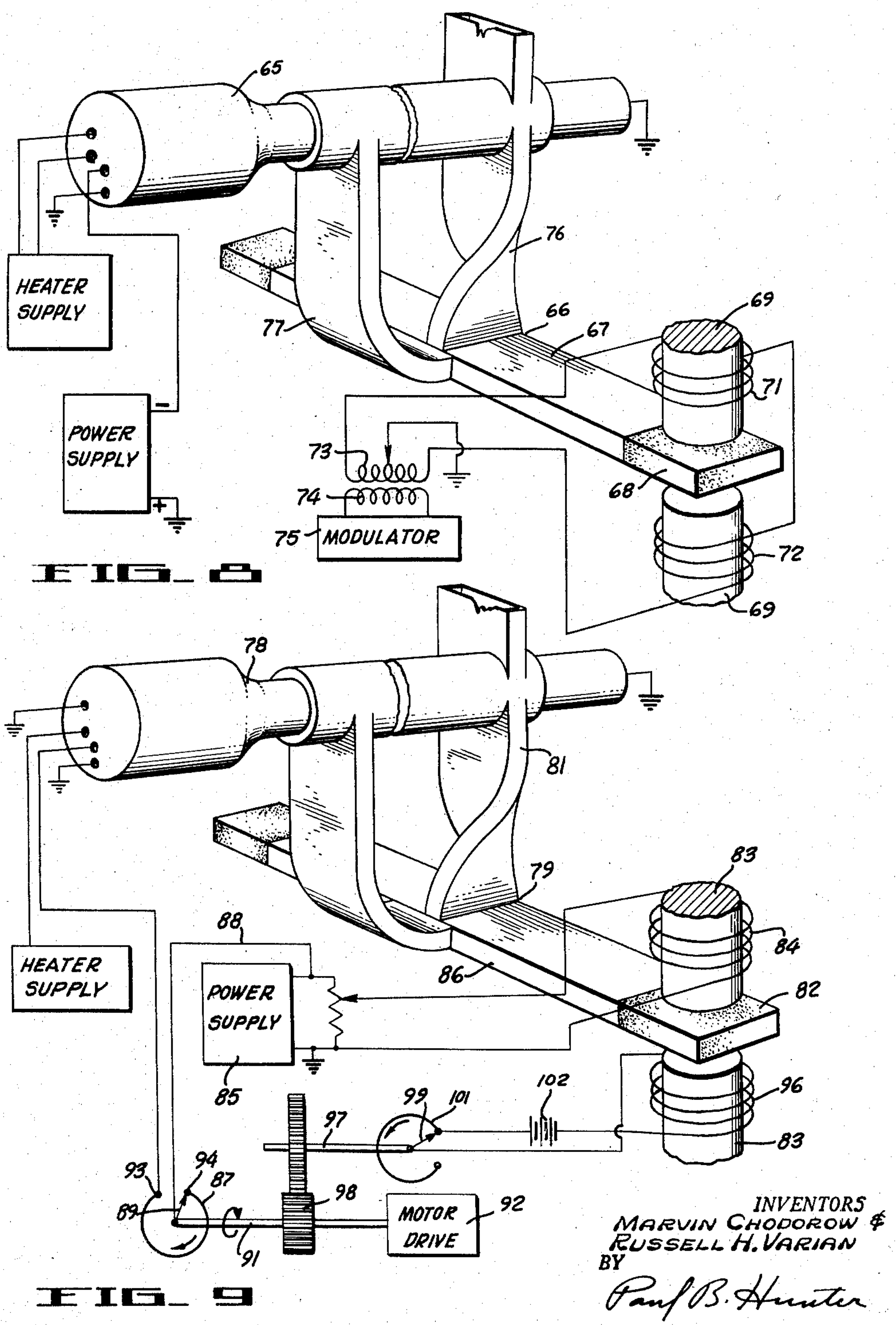
Figure 10:
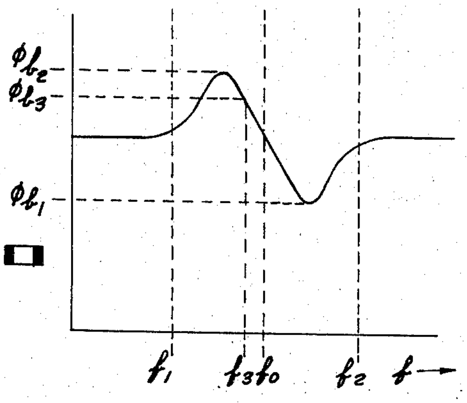
Figure 11:
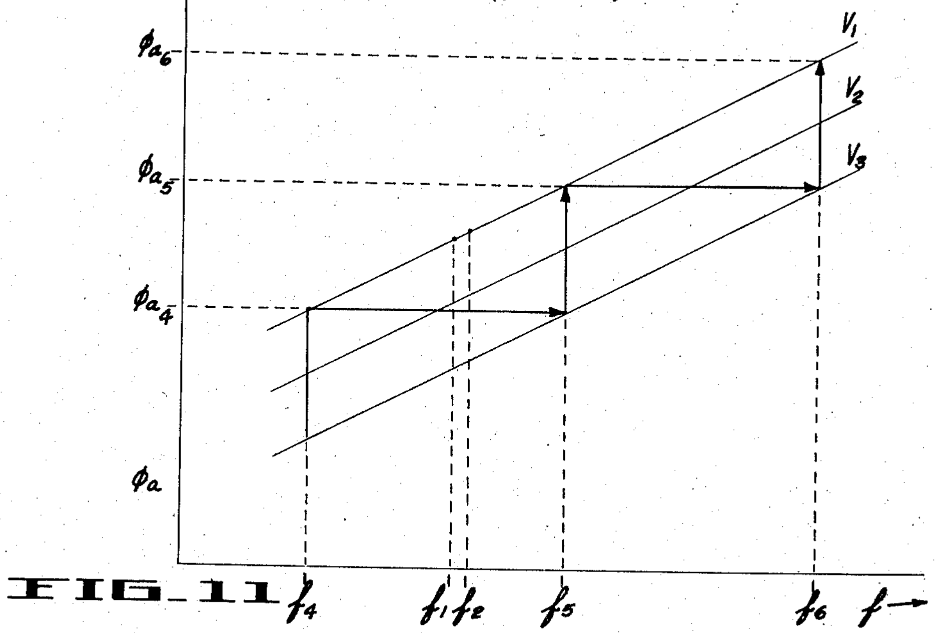
Figure 12:
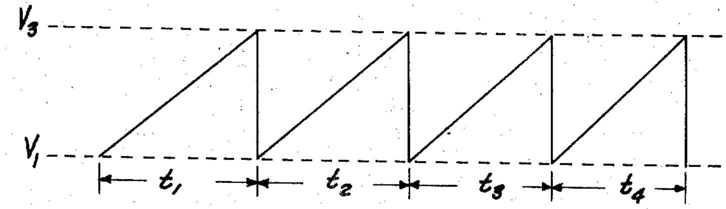

Fig. 6 discloses still another embodiment of this invention utilizing paramagnetic resonance method and apparatus for automatically controlling a klystron oscillator responsive to power supply variations to thereby stabilize the operating frequency thereof;

Fig. 7 discloses a traveling wave oscillator system wherein two methods and means employing paramagnetic resonance are combined and utilized to stabilize the frequency of operation of the traveling wave oscillator during power supply fluctuations;

Fig. 8 discloses a novel method and means utilizing paramagnetic resonance to frequency modulate a traveling wave tube oscillator;

Fig. 9 discloses still another embodiment of this invention which utilizes paramagnetic resonance apparatus and method to automatically and selectively tune a high frequency oscillator over an extremely wide band of operating frequencies;

Fig. 10 is a graphic illustration of the phase shift in the paramagnetic material in Fig. 1 as a function of the frequency of the alternating signal passing therethrough, assuming the polarizing field is maintained constant; and Figs. 11 and 12 illustrate in graphic form the operation of the novel wide band tuning oscillator system disclosed in Fig. 9.

This invention utilizes the phenomenon of gyromagnetic resonance described in U.S. Patent No. 2,561,489 issued July 24, 1951, to Felix Bloch and William W. Hansen and a brief summary of this phenomenon will be given here. In Patent 2,561,489, the gyromagnetic resonance phenomenon was described with reference to the gyromagnetic resonance of nuclei and the same procedure will be followed here in briefly describing the phenomenon. It should be understood that the present invention applies to electron gyromagnetic resonance in paramagnetic materials. As used herein the term "gyromagnetic resonance" means resonance of gyromagnetic bodies or portions of atoms such as electrons with an applied alternating frequency energy.

Two important properties of a nucleus are spin or gyroscopic moment I and magnetic moment $\mu$. Nuclei of the same atoms have a definite value of $$\frac{\mu}{I}$$

different and distinct from nuclei of any other atoms.

If nuclei of a particular atom are placed in a constant unidirectional magnetic field $H_0$, the nuclei, rather than line up in the direction of this field, will begin to precess in this field $H_0$ due to their spin and magnetic moment. Certain ones of the nuclei will line up with a component of I in the direction of one pole of the field $H_0$ while certain others will line up with a component of I in the direction of the opposite pole. However, there will be a preponderance of the nuclei lined up in the direction of one of the poles. The nuclei lined up in one direction will effectively cancel out the effect of an equal number of nuclei lined up in the other direction, and it is the preponderance of nuclei lined up in the one direction in which we will interest ourselves.

The angular rate $\omega_0$ of this precession in the field $H_0$, the frequency of which is termed Larmor frequency $f_0$, is proportional to $$\frac{\mu H_0}{I}$$

Since nuclei of different atoms have different values of $$\frac{\mu}{I}$$

the nuclei of different atoms placed in the same field $H_0$ would precess at different Larmor frequencies. This is also true of the different types of gyromagnetic bodies. For example, electrons found in certain free radicals, which possess gyroscopic moment I and magnetic moment $\mu$, have Larmor frequencies of greatly higher values than Larmor frequencies of nuclei, even with the electrons in a much smaller magnetic field.

Due to damping forces, nuclei do not precess forever in a magnetic field, but the action of external forces resulting from the interaction of neighboring electrons and nuclei tends to align the precessing nuclei with the magnetic field, releasing the associated energy as heat. However, those same forces will also sometimes act oppositely due to thermal agitation whereby an equilibrium is ultimately established in which a small preponderance of nuclei are aligned with the field. The time required to establish this equilibrium is known as the relaxation time. If, after this equilibrium is established, a component of magnetic field $H_1$ is placed at right angles to the constant field $H_0$ with an orientation which rotates about $H_0$ with uniform angular velocity $\omega_1$ of radio frequency $f_1$, as may be furnished in the case of nuclear resonance by a transmitter coil at right angles to the field $H_0$ as shown in the above-cited patent, this magnetic field $H_1$ causes the nuclei to again precess about the field $H_0$, this time at the angular rate $\omega_1$ of the rotating field $H_1$. The angle $\theta$ that the precessing nuclei makes with the vertical field $H_0$ is determined by the angular velocity $\omega_1$, the angle being small for all values of $\omega_1$ less or greater than $\omega_0$. When the angular velocity $\omega_1$ closely approaches and equals the angular velocity $\omega_0$, angle $\theta$ increases rapidly to 90°. A receiver coil placed normal to the constant field $H_0$ will have induced in it a voltage due to the nuclei precessing at the Larmor frequency, the action being analogous to a bar magnet being swept past a coil. This induced voltage may be measured and used to indicate that the frequency $f_1$ at which the nuclei are precessing is in fact the Larmor frequency $f_0$. It should be noted that the induced signal will be evident over a band of resonant frequencies rather than just as one particular resonant frequency, the signal being at a maximum amplitude at the one particular frequency in the band.

This present invention utilizes the gyromagnetic resonance of electrons in paramagnetic substances, rather than the gyromagnetic resonance of nuclei. Some differences between these two phenomena are that the resonance frequencies and other parameters are different, the resonance frequency of the hydrogen nucleus in a given D.-C. field of, say, 10 kilogauss being of the order of 40 megacycles per second while the resonant frequency of the electrons in a paramagnetic substance such as diphenyl picryl hydrazyl in a D.-C. field of 2000 gauss strength is obout 8000 megacycles per second. Since the latter frequency is a typical operating frequency for a klystron oscillator or traveling wave tube oscillator of the type used in certain embodiments of this invention, paramagnetic or electron resonance is especially suited for use in connection with these high frequency devices. The term paramagnetic material is meant to encompass those materials with atoms possessing unpaired spins which produce a net permanent atomic magnetic moment, the paramagnetic resonance frequency of such materials being proportional to the polarizing or aligning magnetic field. This term is meant to exclude ferromagnetic materials which possess a very strong interaction between their dipoles, the resonance of such materials being practically independent of the strength of any applied magnetic field. The term paramagnetic is not meant to include any ferromagnetics which may exhibit paramagnetic properties when found above certain critical temperatures.

Referring now to Fig. 1 there is shown a rectangular wave guide 1 having a volume of gyromagnetic matter 2 of the paramagnetic type such as diphenyl picryl hydrazyl fixedly secured within the guide in a suitable container. This wave guide is located between the poles of a magnet 3′ at the point wherein the paramagnetic matter is located. Wound about one of the poles of the magnet is a coil 3 which is connected in series with a rheostat 6 and a battery 4. The magnet 3′ and coil 3 thus produce a magnetic field $H_0$ transverse of the wave guide, the strength of this field being variable by means of the rheostat 6. An alternating signal of radio frequency passing through the wave guide in the direction of the arrow 5 is composed of an electrical component extending in the vertical direction and a magnetic component extending in the horizontal direction. If the electrons in the paramagnetic matter are not at or near resonance, the effective electrical length and impedance characteristics of the matter will depend upon the matter's dielectric characteristics. Assuming that the frequency of the transmitted signal is constant, the gyromagnetic electrons may be brought to the region of resonance by adjusting the rheostat and thus the polarizing magnetic field $H_0$. Conversely, the field $H_0$ may be maintained constant and the region of resonance reached by varying the frequency of the transmitted signal. Within the resonance region, the volume of material will have an effective electrical length greater or less than the electrical length when the material is not at resonance. Thus the number of wave lengths or cycles of a certain frequency signal between the point of ingress and the point of egress in the fixed volume of matter 2 can be varied over a wide range of values. The electrical length may be automatically varied from maximum electrical length to minimum electrical length and to any effective electrical length therebetween over the band of resonant frequencies by either varying the current in the coil 3 to thus vary the strength of the polarizing magnetic field $H_0$ while the frequency passing through the wave guide remains fixed or by maintaining the current in the coil fixed and varying the frequency of the wave passing through the wave guide 1 or by a combination of both operations.

In Fig. 10 is shown a graphic illustration of the phase shift $\varphi_b$ or electrical length in the gyramagnetic material 2 as a function of the frequency $f$ of the radio frequency signal passing therethrough, assuming the polarizing magnetic field remains at a constant value and disregarding the dielectric characteristics of the material which will be minor upon proper selection of the material. The resonant frequency band extends between the frequencies $f_1$ and $f_2$, the point of maximum resonance being indicated by $f_o$. A similar resonance curve would occur if phase shift $\varphi_b$ were plotted versus polarizing field H while maintaining the frequency of the signal passing therethrough constant. If any particular phase shift in the matter 2 is desired, such as, for example $\varphi_{b3}$, a change in the frequency of the signal passing through to a value $f_3$ while maintaining the polarizing field constant, or a certain change in the strength of the polarizing field while maintaining the frequency constant, will produce the desired phase shift $\varphi_{b3}$.

Referring to Fig. 2, there is shown therein a wave guide 7 having a shunt arm 8 coupled thereto through aperture 9. Located in this side arm is a volume of paramagnetic substance 11 such as diphenyl picryl hydrazyl and enveloping this arm is a magnetic field $H_0$ produced by a magnet 12′ and a coil 12 encircling one pole of the magnet connected in series with a battery 13 and rheostat. In a manner similar to that described for the operation of the apparatus shown in Fig. 1, the electrical length of this side or shunt arm may be controlled by correlating the frequency of the signal transmitted through the wave guide 5 and the field $H_0$ to produce electron resonance and thereby cause the shunt arm to exhibit electrical characteristics ranging from an open circuit shunt to a short circuit shunt. This device shown in Fig. 2 may be termed a shunt element while the apparatus disclosed in Fig. 1 may be termed a series element.

Referring now to Fig. 3, there is shown one embodiment of this invention wherein the changing of the electrical length of a feedback circuit by means of paramagnetic resonance is utilized by a klystron oscillator to stabilize the frequency of operation thereof. The natural frequency of oscillation or operating frequency of a klystron oscillator is determined in the main part by the dimension of its cavity resonators and the spacing of the resonator grids and to a lesser extent by the accelerating or beam voltage supplied by its power supply.

At optimum operation of a klystron oscillator at a certain fixed frequency, the necessary total feedback phase shift from the output of the klystron back through the feedback circuit to the input of the klystron and then through the klystron to the output is necessarily composed of an integral number of cycles. This total phase shift comprises the phase shift through the feedback circuit from the output of the tube to the input, the transit angle of the electron beam through the klystron tube from the input to the output, and the phase shift between the radio frequency current in the beam and the voltage across the gap at the output cavity. Under optimum operation of the klystron at its resonant frequency, this latter phase shift is zero. If the electron beam accelerating voltage should vary slightly so as to change the velocity of the beam through the tube and thus change the transit angle through the klystron, the number of cycles in the total phase shift around the circuit will change to a value slightly less or greater than the above-mentioned integral number depending on the direction of the voltage variation. The total phase shift is restored to an integral number of cycles by the klystron changing its operating frequency. This change in frequency will cause a change in the phase shift between the radio frequency current in the beam and the output gap voltage of just the right amount to restore the total phase shift to the proper integral value. The change in operating frequency of a klystron oscillator which is necessary to restore the number of cycles in the total phase shift to an integral number for a given change in accelerating voltage is inversely proportional to the Q of the output cavity of the klystron. Thus, the higher the Q of the output cavity, the smaller the change in frequency necessary to restore the number of cycles in the total feed back phase shift to an integral number. If it were possible to use a cavity of infinite Q, theoretically no change in operating frequency would be necessary.

The novel paramagnetic resonance apparatus shown in Fig. 3 provides means whereby very good frequency stability may be provided without the use of such highly stable power supplies. This novel apparatus comprises a klystron oscillator including a buncher or input cavity resonator 14, a catcher or output cavity resonator 15, associated resonator grids 16, 17, 18, and 19, and a wave guide feedback circuit 22 connecting the output cavity resonator and the input cavity resonator. This klystron receives its driving power from a main power supply 21 and its heater current from a separate supply (not shown). Located in the wave guide feed back circuit is a volume of paramagnetic resonance material 23 such as diphenyl picryl hydrazyl which may be contained in a suitable container. Transverse of this feedback wave guide 22 at the point wherein the paramagnetic resonance material 23 is located is a magnetic field produced by magnet 24' and associated coil 24 carrying direct current supplied, for example, by a battery 25. Under normal operating conditions, the klystron tube oscillates at a predetermined resonant frequency which is determined by the physical characteristics of the tube and the applied beam accelerating voltage. The electrons in the paramagnetic material need not be near resonance to permit the radio frequency energy to pass through the feedback circuit but, until the region of resonance is approached, the paramagnetic material will exhibit ordinary dielectric characteristics. If the polarizing magnetic field transverse of the wave guide 22 produced by the magnet 24' and coil 24 is of such value that the electrons in the paramagnetic material are in the region of resonance at the particular operating frequency transmitted through the wave guide feedback, the material will then be able to affect the electrical length of the feedback circuit with changing parameters. If the main power supply output changes, the klystron operating frequency will vary and this change in frequency passing through the paramagnetic material 23 in the wave guide 22 will cause the electrical length of the material to vary from that value which it possessed before the voltage change to a value which will just compensate for the change in transit angle in the tube. A very small change in frequency will produce a large change in the electrical length of the paramagnetic material and thus, for even large deviations in the output of the power supply, the change in operating frequency will be small when operating in the resonant frequency band of the electrons in the paramagnetic substance.

Referring to Fig. 4 there is shown therein an embodiment of this invention which comprises a stabilized klystron oscillator in which the electrical length of the feedback circuit will automatically vary with changes in power supply to maintain the oscillator operating at one fixed frequency. To the apparatus disclosed in Fig. 3 has been added a novel means for controlling the direct current passing through the coil 24. More particularly, a voltage divider 26 is connected across the output of the power supply and the adjustable center tap 27 on the voltage divider is connected to the polarizing coil. Under normal operation of the oscillator, the voltage across the coil is fixed so that the desired operating frequency of the klystron lies within the paramagnetic resonance band of the material. If the power supply output should vary, which variation would tend to vary the operating frequency of the klystron, the voltage across the voltage divider 26 will vary proportionally in a predetermined manner. This voltage variation produces a proportional voltage variation across the polarizing coil which in turn changes the strength of the polarizing field $H_0$. This change in polarizing field produces a variation in the effective electrical length of the paramagnetic resonance material, thus compensating for the change in transit angle and returning the number of cycles in the feedback circuit to an integral number. Since the electrical length of the feedback circuit has been varied just the right amount to compensate for the change in power supply and restore the number of wave lengths in the feedback to an integral number, the operating frequency of the klystron will remain at the one particular frequency at which it was operating before the change in power supply output.

Referring to Fig. 5 there is shown therein a two-cavity klystron oscillator having its output coupled to its input through a feedback circuit which comprises a section of wave guide 28 forming one arm of a magic tee or hybrid junction 29 and a second section of wave guide 31 forming another arm of the magic tee. The output of the klystron oscillator is obtained through the output wave guide 32. The magic tee comprises a junction of four similar wave guides. Arms 33 and 34 of the hybrid junction are shown of similar construction with identical terminations so that their impedances are the same looking from the junction and therefore the bridge is normally balanced. When balanced, power introduced into arm 28 will divide between arms 33 and 34 but no power will appear at arm 31 or, to put it another way, power inserted into arm 28 will not be transmitted through guide 31. Another type of microwave bridge circuit is a hybrid ring and this may be used in place of the hybrid junction as well as other types of bridge circuits.

Therefore, when the hybrid junction 29 connected between the catcher and buncher cavity resonators is balanced, there will be no power fed back from the catcher resonator 35 to the buncher resonator 36 and the klystron will not be able to operate as a self-sustained oscillator. If the hybrid junction is unbalanced, then the power will pass through the arms 28 and 31 from the catcher resonator to the buncher resonator and self-sustained oscillations will result. The termination of arm 34 contains paramagnetic matter 37 such as diphenyl picryl hydrazyl. This paramagnetic resonance material may be contained in a suitable container in the guide. Arm 33 need not be physically identical to arm 34, but may terminate in any type of load 38 which will give a balanced bridge outside the resonant band of the electrons in the paramagnetic material. The end of the arm 34 is located in a unidirectional magnetic field existing between the pole faces of a magnet 39 and the electrons in the paramagnetic resonance matter 37 line up with this field. As long as paramagnetic resonance of these electrons does not occur, the bridge will be in balance. The klystron, operating at one particular frequency, will feed a small amount of power back through arm 28 from the catcher resonator 35 thus setting up an electromagnetic wave of the particular operating frequency in the direction of arrow 41 in the arm 34. This electromagnetic wave in the arm 34 is composed of the electrical component 42 in the vertical direction and the magnetic component 43 in the horizontal direction. This magnetic component is perpendicular to the unidirectional field $H_0$ between the pole faces of the magnet 39 and these two fields are so correlated that resonance of the electrons occurs in the paramagnetic material. This resonant condition in the termination of the arm 34 will change the impedance of arm 34 as seen at the junction, thus throwing the bridge into unbalance. The radio frequency power from the catcher resonator at this particular frequency will thus pass through the arm 31 to the buncher resonator and the klystron oscillator will be self-oscillating at this desired frequency. If the output from the power supply 44 should vary, the operating frequency of the klystron will likewise vary. This variation in frequency of the radio frequency magnetic field exciting the electrons in the termination of arm 34 will cause the impedance looking toward the junction to change and thereby produce a phase shift in the feedback circuit which will compensate for the change in transit angle through the klystron. Since the Q of the resonant electrons is very high, only a very small change in operating frequency is necessary to restore the number of cycles in the total feedback phase shift to an integral number. This stabilizing system may be utilized in traveling wave tube oscillators and oscillators of other types as well as with klystrons.

Referring now to Fig. 6, there is shown therein an embodiment of this invention which comprises a stabilized klystron oscillator in which the phase shift through the feedback circuit will automatically vary with changes in power supply to maintain the oscillator operating at one frequency. To the apparatus disclosed in Fig. 5 has been added a novel means for controlling the polarizing field and similar parts bear similar reference numerals. More particularly, an auxiliary or trimmer coil 45 is wound about one of the magnetic poles of the permanent magnet and is connected to a center tap 46 on a voltage divider 47 connected across the output of the klystron power supply. The unidirectional field $H_0$ between the pole faces of the magnet is made up of the magnetic field produced by the permanent magnet less the magnetic field produced by the current carrying auxiliary coil 45 which opposes the magnet's field. If the output of the power supply 44 should vary so as to tend to vary the operating frequency of the klystron, the current through the auxiliary coil 45 will vary to thus change the resultant magnetic field $H_0$, thereby changing or shifting the resonant or Larmor frequency band of the electrons in the paramagnetic matter in arm 34. This change in the resonant frequency band of the material will change the band pass features of the hybrid junction so that the bridge will exhibit slightly different unbalance characteristics at the particular operating frequency than before and will thus cause a change in the phase shift through the magic tee, thus restoring the total feedback phase shift to an integral number of cycles. The operating frequency of the klystron remains at the same value as before the change in power supply took place.

Fig. 7 discloses a novel embodiment of this invention which combines the novel features of an oscillator system as disclosed in Fig. 6 with the novel features of the oscillator system shown in Fig. 4. The oscillator tube shown for illustration purposes is a traveling wave tube oscillator 51 having its output coupled to its input through a magic tee 52. One side arm 53 contains a paramagnetic substance 54 and is positioned between the poles 55 of a magnet. The arm 56 coupled to the input of the traveling wave tube also contains a volume of paramagnetic substance 57. Transverse of the wave guide arm 56 is a magnet 58' and associated coil 58 for producing a unidirectional field. An auxiliary coil 59 is wound about one of the poles 55 of the magnet. The coil 59 is connected to an adjustable center tap 61 of a voltage divider 62 connected across the output of the oscillator power supply 63. The coil 58 is similarly coupled to the power supply 63 through a variable voltage divider 64 across the power supply output.

The unidirectional field across the pole faces of the magnet is adjusted by means of the voltage divider 62 so that the electrons in the paramagnetic substance are at resonance and the magic tee is unbalanced at the desired operating frequency of the traveling wave tube oscillator. Thus, the radio frequency power is permitted to pass through the feedback circuit from the output of tube 51 to its input.

In addition, the unidirectional field produced by the magnet 58' and the coil 58 is fixed by means of the voltage regulator 64 so that the operating frequency of the traveling wave tube oscillator 51 is in the resonance band of the electrons of the paramagnetic material 57.

Now, should the output from the power supply 63 vary, thus tending to vary the operating frequency of the traveling wave tube, the current through coil 59 will vary to thus change the resultant magnetic field enveloping the paramagnetic material 54, thus changing the Larmor frequency band of the electrons therein. This change in the resonant frequency band will change the band pass features of the magic tee 52 so that it will exhibit slightly different unbalance characteristics at the particular operating frequency than before and will thus cause a change in the phase shift through the magic tee. Also, the change in power supply output will result in a change in current flow through coil 58 and resultant change in the polarizing field produced thereby. This change in field strength produces a variation in the effective electrical length or phase shift of the paramagnetic resonance material 57. This apparatus may be so adjusted that the phase shift through the tube and the phase shift through the fixed portions of the feedback circuit, the phase shift produced in the magic tee by the paramagnetic material 54 and the phase shift in the feedback circuit due to the paramagnetic material 57 will equal $2\pi n$ radians where $n$ is an integral number and also that the latter two phase shifts will always change to compensate for changes in the phase shift through the tube to maintain the total phase shift at an integral number of cycles. Thus it can be seen that the two novel paramagnetic means utilized to stabilize the frequency of operation of an oscillator may be combined to aid each other in accomplishing the desired stabilization.

This novel apparatus may be also utilized to tune the oscillator over a very wide band of frequencies as will be subsequently described.

Referring now to Fig. 8 there is shown therein novel means for frequency modulating a radio frequency oscillator such as the traveling wave tube oscillator 65 shown. The output of the traveling wave tube is coupled to the input through a feedback circuit including the magic tee 66. One side arm 67 of the magic tee contains a paramagnetic substance 68 and is positioned between the pole faces of a magnet 69. Auxiliary coils 71 and 72 are serially wound about the poles of the magnet and are connected to the secondary winding 73 of a transformer. A center tap on the secondary winding is connected to ground. The primary winding 74 of the transformer is connected to a source of modulating signals 75, for example, an audio frequency signal source.

The apparatus is so arranged that the desired operating frequency of the traveling wave tube oscillator is the mid-point frequency in the resonant frequency band of the electrons in the paramagnetic material 68 in the field produced by the magnet 69. Therefore, the magic tee is unbalanced and power is fed back through the arms 76 and 77. As the modulating signal is impressed on the primary winding 74, the alternating current induced in the secondary winding 73 and passing through the auxiliary coils 71—72 produces a field which alternately adds to and subtracts from the field produced by the magnet 69. The resultant magnetic field thus varies about a midpoint value of field strength and produces a variation in the resonance characteristics of the electron in the matter 68, this latter variation also occurring in an oscillatory manner. This oscillatory variation of the resonance characteristics produces a continually varying change in the band pass features of the magic tee thus resulting in an oscillatory type variation in the frequency of operation of the traveling wave tube. Thus, the output from the traveling wave tube would be a frequency modulated signal which varies about a midpoint frequency, determined by the magnetic field produced by the magnet alone, the variation being dependent on the modulating signal transmitted to the coils 71—72.

Fig. 9 shows a novel apparatus for automatically tuning a high frequency oscillator, in this present embodiment a traveling wave tube 78, over a very wide frequency band which will give constant power output and efficiency over the entire range. Traveling wave tubes are very good amplifiers over very wide frequency ranges but their frequency range when used as oscillators is limited to a great extent because of the phase shift requirements in the feedback circuit. When used as an oscillator and tuning is attempted by the common method of varying the beam voltage, the change in operating frequency is accompanied by a shifting in the phase of the voltage fed back and, after a small change in frequency without compensating phase shift in the feedback, the oscillator will cease oscillation.

In this novel wide band oscillator apparatus, the feedback circuit of the traveling wave tube comprises a magic tee 79 which is similar in construction to the magic tee shown in the above figures. The arm 86 of this magic tee which contains the paramagnetic material 82 is located in the unidirectional magnetic field between pole faces of magnet 83. The magnetic field may be controlled by means of an auxiliary or trimmer coil 84 to compensate for the random small beam voltage variations in a manner similar to that described for controlling the klystron oscillator in Fig. 6 if desired. In other words, as the output from the power supply 85 randomly varies, the current through the trimmer coil 84 also varies to change the resonance characteristics of the paramagnetic resonance material in the termination of arm 86 to thereby vary the feedback characteristics of the feedback circuit and maintain an integral number of wave lengths in the feedback to maintain the operating frequency of the traveling wave tube constant.

The operating frequency of this traveling wave tube oscillator may be varied over a wide range of operating frequencies by varying the beam voltage of the tube while at the same time compensating for the feedback voltage phase shift as the tube is tuned. The variation in beam voltage is accomplished in this embodiment by means of a rheostat 87 which is connected in series with the power supply lead 88. The center tap 89 of this rheostat 87 is mounted on a driving shaft 91 which may be manually turned or may be automatically turned at a constant speed by a clock-type motor 92 or at any desired constant or interrupted rotational speed. As this shaft 91 is rotated, the center tap 89 is rotated clockwise to thereby decrease the resistance included in the output lead 88 and thereby increase the beam voltage. This rheostat 87 has two terminals 93 and 94, the center tap being so designed as to bridge both terminals when passing from the low resistance end or terminal 93 to the high resistance end or terminal 94. It can thus be seen that as the shaft 91 is rotated clockwise, resistance is removed from the power supply lead 88 in uniform manner until such time as the center tap 89 reaches the low resistance end or terminal 93 at which time the center tap 89 passes from the terminal 93 to the high resistance terminal 94, reinserting all the resistance in the power supply lead 88. The power supply voltage is thus varied uniformly in a sawtooth manner from a low voltage when the center tap 88 is on terminal 94 to a high voltage when the center tap is on terminal 93 and jumping back to the low voltage as the center tap contact 89 passes from terminal 93 to terminal 94. Continued rotation gives multiple sawtooth variations in beam voltage.

As this voltage is varied uniformly from the low voltage to the high voltage, the frequency of operation of the tube increases and the transit angle of the beam through the traveling wave tube varies, thus varying the feedback phase shift. To compensate for these variations in transit angle, a second rheostat 95 is provided for uniformly varying the current through a second auxiliary or trimmer coil 96 associated with the magnet. As the driving shaft 91 is rotated clockwise, driven shaft 97 rotates counter-clockwise through reduction gears 98, shaft 97 rotating at a lower rate of speed than shaft 91. Mounted on the driven shaft 97 is the center tap 99 of a rheostat 101, this center tap making, for example, one revolution for four revolutions of the center tap 89. Connected in a series circuit are the rheostat 101, the second auxiliary coil 96 and a battery 102. As the resistance is decreased in the power supply lead 88 to the tube, the resistance of rheostat 101 is also uniformly removed from in series with the auxiliary coil 96. The current in coil 96 thus increases uniformly, the coil being wound about the magnet pole so that the increasing field produced by the coil 96 adds to the magnetic field of the magnet. The increase in magnetic field changes the resonance characteristics of the electrons in the material and thus changes the feedback characteristics of the magic tee, thus maintaining the number of wave lengths in the total feedback stage at an integral number. At the instant when the center tap 89 passes from terminal 93 to terminal 94 to drop the beam voltage to the original lower value, the velocity of the beam is immediately reduced and the number of wave lengths in the transit angle through the tube drops one integer. Since there is still an integral number of wave lengths in the feedback circuit, even though one less in number than originally, the tube continues to operate with optimum performance at the frequency at which it was operating at the point when the beam voltage dropped to its original low value.

Referring to Fig. 11 there is shown a plot of phase shift $\phi_a$ through the traveling wave tube and feedback circuit of Fig. 9, excluding the phase shift through the paramagnetic substance 82 in the feedback circuit, versus frequency $f$ of operation of the tube for three different beam voltages, $V_1$, $V_2$ and $V_3$, where $V_3>V_1$. The phase shift due to resonance in the para magnetic substance alone is similar to that illustrated in Fig. 10. The relative sizes of the two graphic plots are realized by observing the width of a resonant band of frequencies as represented by $f_1$ to $f_2$ in Fig. 10 as shown on the curves of Fig. 11. The range of beam voltages provided by the variable rheostat 87 is $V_1$ to $V_3$.

As the phase shift $\phi_a$ through the tube and portion of the feedback circuit varies due to a variation in beam voltage, which brings about an increase in the operating frequency of the tube, a compensating phase shift $\phi_b$ must be produced in the feedback circuit due to the paramagnetic substance such that $\phi_a+\phi_b=n2\pi$ radians at all times, where $n$ is an integral number.

As the beam voltage increases from $V_1$ to $V_3$, resulting in an increase in the operating frequency of the traveling wave tube from $f_4$ to $f_5$, the polarizing magnetic field is automatically varied from a value $H_4$ to $H_5$ so that the electrons in the paramagnetic substance will be at resonance at all times at the operating frequency of the traveling wave tube as the operating frequency is varied from $f_4$ to $f_5$, and the phase shift $\phi_a$ through the tube will be maintained at the value $\phi_{a_4}$, such that $\phi_{a_4}+\phi_b=n2\pi$ radians where $n$ is a particular integral number such as, for example, 20. As the center tap 89 passes from terminal 93 to terminal 94, the beam voltage changes abruptly from $V_3$ back to $V_1$, thus changing the phase shift from $\phi_{a_4}$ to $\phi_{a_5}$ which is a change of one integer in the total number of wave lengths in the feedback circuit. The sum of $\phi_{a_5}+\phi_b$ now equals $(n-1)$ $2\pi$ radians. Since the total phase shift is still an integral number, i.e. $(n-1)$, of wave lengths, the traveling wave tube will continue to oscillate at the frequency $f_5$. As the beam voltage is again varied from $V_1$ to $V_3$ by means of rheostat 87, the operating frequency of the traveling wave tube varies over the range from $f_5$ to $f_6$. The polarizing magnetic field is varied from field strength $H_5$ to $H_6$ by continued rotation of rheostat 101 to maintain the magic tee unbalanced over the range of operating frequencies between $f_5$ and $f_6$. When the beam voltage again jumps from $V_3$ back to $V_1$, the phase shift $\phi_a$ changes from $\phi_{a_5}$ to $\phi_{a_6}$. Now $\phi_{a_6}+\phi_b$ equals $(n-2)$ $2\pi$ radians. In this manner, the traveling wave tube oscillator may be tuned over a very wide range of operating frequencies by simultaneously varying the beam voltage in a sawtooth manner and the polarizing magnetic field in a continuous manner. If a power supply having a very wide range of output voltage is available, it will not be necessary to use the sawtooth variation described above with the resultant variation by integral numbers of the feedback phase shift. The advantage of using a sawtooth variation in supplied voltage is that the power supplied to the tube may be held reasonably constant since the variation in power supply voltage may be held within a relatively small range whereas in using a continually changing supply voltage, the power supplied to the tube changes by a very large amount.

Since the individual ranges of beam voltages necessary to produce an integral number of cycles change in the feedback phase shift may not be exactly the same width, as the operating frequency of the traveling wave tube varies over a large frequency range, the beam voltage may be varied in sawtooth manner with decreasing or increasing rates of change as illustrated in Fig. 12, where $t_1>t_2>t_3>t_4$. A rheostat could be utilized in place of rheostat 87 to accomplish this result wherein segments having equal values of resistance are passed over in decreasing periods of time.

Referring again to Fig. 7, the apparatus disclosed therein may be readily utilized to tune an oscillator such as the traveling wave tube oscillator over a very wide band of frequencies such as described for Fig. 9 but without variation in the power supply voltage. The tuning may be done manually or it may be done automatically by use of a motor drive similar to that described for Fig. 9.

Tuning may be accomplished by varying the current through coil 59 to thereby vary the strength of the polarizing magnetic field enveloping the paramagnetic substance 54 in the arm 53. Consider that by adjustment of center tap 61 the magic tee is unbalanced until the amplitude of the feedback signal transmitted through arm 56 is at a maximum or optimum value. The phase shift produced in the feedback circuit by the resonance in arm 53 at this particular value of magnetic field may not be such that the total feedback phase shift is an integral number of radians. The paramagnetic substance 57 in the arm 56 may then be utilized to maintain the total feedback phase shift at a whole number of cycles. The material is physically of a length such that its electrical length can be varied over a whole cycle or more while tuning over the whole frequency range. Or stated in another way, the phase shift can be changed by one cycle or more with the magnetic field produced by magnet 58' and associated coil 58 turned on as compared to the phase shift without any magnetic field.

Therefore, by selecting the proper magnetic field enveloping substance 57 for the frequency passing therethrough, the total phase shift may be brought to an integral number of radians. This adjustment may be done by means of the rheostat 64. Since the material 57 will supply at least a phase shift therethrough of from zero to $2\pi$ radians, when the magnetic field is adjusted to give $2\pi$ at a particular frequency the magnetic field may be jumped back to a value which will give zero radians. This is done by moving the center tap of rheostat 64 back to a position which will produce one less cycle in the phase shift through the material 57. Since there is still an integral number of cycles in the total feedback, the frequency will not be affected by the sudden jump in magnetic field.

It should be understood that in any of the above embodiments suitable modifications may be made in the apparatus such as, for example, the inclusion of amplifier means in the feedback circuits to amplify the feedback energy, if desired, and magnetic shunt apparatus may be utilized as is well known to change the strength of the permanent magnets.

In all of the above depicted embodiments of this invention shown, the polarizing magnetic field has been shown transverse to the waveguide in which it is contained. The field may also be associated with the waveguide in other directions such as, for example, along the longitudinal axis of the waveguide.

Since many changes could be made in the above constructions of this novel invention and many apparently widely different embodiments of this invention could be made without departing from the scope thereof, such as, for example, the utilization of this invention with transmission lines and bridge circuits of types other than wave guides, it is intended that all matter contained in the above description or shown in the accompanying drawings shall be interpreted as illustrative and not in a limiting sense.

What is claimed is:

1. An electrical circuit element comprising a wave guide for transmitting radio frequency energy therethrough, a shunt wave guide arm coupled to the first wave guide, a volume of paramagnetic material positioned in said shunt arm comprising electrons having the properties of magnetic moment and gyroscopic moment, and means for producing a unidirectional magnetic field enveloping the material within the shunt arm, whereby variation in the ratio of the strength of the unidirectional magnetic field to the frequency of the radio frequency energy produces a variation in the effective electrical length of the shunt arm due to the electron resonance therein.

2. In combination, a radio frequency oscillator comprising a wave guide feedback circuit coupling the output thereof to the input, a volume of paramagnetic material comprising electrons possessing the properties of magnetic moment and gyroscopic moment coupled to said feedback circuit in said wave guide, and means for producing a unidirectional magnetic field enveloping said matter, whereby variation of the ratio of the frequency of the radio frequency energy fed back through the feedback circuit to the strength of the unidirectional field produces a variation in the effective electrical length of the feedback circuit due to the electron resonance therein.

3. In combination, an electron device, a feedback circuit coupling the output of the device to the input thereof, said feedback circuit comprising a bridge circuit having four waveguide arms, one of the arms being coupled to said output and the second of said arms being coupled to said input, feedback energy being coupled from the output to the input through the first and second waveguide arms when the bridge is unbalanced, the third of said arms containing a volume of paramagnetic material comprising electrons having the properties of magnetic moment and gyroscopic moment, the fourth arm being adapted to balance the third arm, and means for producing a unidirectional magnetic field enveloping the gyromagnetic matter in the third arm, the strength of the magnetic field and the frequency of the energy produced by the device being so proportioned as to produce a gyromagnetic resonance of the electrons in the matter to thereby produce an unbalanced bridge.

4. In combination, a radio frequency oscillator comprising a waveguide feedback circuit coupling the output thereof to the input, a paramagnetic resonance means including a volume of paramagnetic material comprising electrons possessing the properties of magnetic moment and gyroscopic moment coupled to said feedback circuit in said waveguide and means for producing a unidirectional magnetic field enveloping said matter, whereby variation of the ratio of the radio frequency energy fed back through the feedback circuit to the strength of the unidirectional field produces a variation in the effective electrical length of the feedback circuit due to the electron paramagnetic resonance therein, and means for varying the ratio of the frequency of said radio frequency energy to the strength of said unidirectional field.

5. The combination as claimed in claim 4 including a source of variable electrical power for driving said radio frequency oscillator, said means for varying the ratio of the frequency of said radio frequency energy to the strength of said unidirectional field comprising circuit means coupling the source of power to the paramagnetic resonance means to thereby vary the feedback characteristics with variations in electrical power.

6. The combination as claimed in claim 5 including a control circuit means coupled to said source of variable electrical power and coupled to said means for varying the ratio of the frequency of said radio frequency energy to the strength of said unidirectional field for both varying the driving power to vary the frequency of operation of the oscillator and for varying the paramagnetic resonance means for shifting the paramagnetic resonance frequency band to thereby maintain the operating frequency of said radio frequency oscillator within the band of paramagnetic resonance frequencies.

7. The combination as claimed in claim 4 wherein said waveguide feedback circuit comprises a bridge circuit having four waveguide arms, one of the arms being coupled to said output and the second of said arms being coupled to said input, feedback energy being coupled from the output to the input through the first and second wave guide arms when the bridge is unbalanced, the third of said arms containing said volume of paramagnetic material in said paramagnetic resonance means, and the fourth arm being adapted to balance the third arm.

8. The combination as claimed in claim 7 including a source of variable electrical power for driving said radio frequency oscillator, said means for varying the ratio of the frequency of said radio frequency energy to the strength of said unidirectional field comprising circuit means coupling the source of power to the paramagnetic resonance means to thereby vary the feedback characteristics with variations in electrical power.

9. The combination as claimed in claim 4 wherein said waveguide feedback circuit comprises a bridge circuit which passes radio frequency energy from the output to the input when said bridge is unbalanced, said paramagnetic resonance means being coupled to said bridge circuit for unbalancing the bridge circuit when said paramagnetic resonance occurs.

10. The combination as claimed in claim 4 wherein said feedback circuit comprises a bridge circuit which passes radio frequency from said output to said input when unbalanced and wherein said paramagnetic resonance means is connected in series with the feedback circuit to vary the electrical length of the feedback circuit in the region of resonance of the paramagnetic resonance means, and a second paramagnetic resonance means coupled to said bridge circuit for unbalancing the bridge at a particular resonance band of frequencies for permitting passage of feedback energy through said feedback circuit when the bridge is unbalanced.

11. The combination as claimed in claim 4 wherein said means for varying the ratio of frequency of said radio frequency energy to the strength of said unidirectional field comprises a source of modulating energy.

12. The combination as claimed in claim 11 wherein said source of modulated energy is coupled to said unidirectional field producing means for varying the strength of the unidirectional magnetic field.

13. The combination as claimed in claim 11 wherein said feedback circuit comprises a bridge circuit adapted to permit energy to pass through the feedback circuit when the bridge is unbalanced, said paramagnetic resonance means being coupled to the bridge for unbalancing the bridge at a particular band of operating frequencies.

References Cited in the file of this patent

UNITED STATES PATENTS

| | | |
|---|---|---|
| 2,521,760 | Starr | Sept. 12, 1950 |
| 2,559,730 | Norton | July 10, 1951 |
| 2,589,494 | Herschberger | Mar. 18, 1952 |
| 2,644,930 | Luhrs et al. | July 7, 1953 |
| 2,645,758 | deLindt | July 14, 1953 |
| 2,647,239 | Tellegen | July 28, 1953 |
| 2,671,884 | Zaleski | Mar. 9, 1954 |
| 2,793,360 | Beaumont | May 21, 1957 |

OTHER REFERENCES

American Standard Definitions of Electrical Terms, page 48, Aug. 12, 1941. (Pub. by AIEE, 33 W. 39th Street, N.Y.)

Bell Lab. Record, Holded, pp. 121—126, vol. 31, No. 4, April 1953.

The Sylvania Technologist, vol. 8, No. 3, July 1955, pp. 76–83.